(12) United States Patent
Yu

(10) Patent No.: US 7,846,370 B2
(45) Date of Patent: Dec. 7, 2010

(54) THREADED CORE, INJECTION MOLDED APPARATUS METHOD FOR MAKING LENS BARREL

(75) Inventor: Sheng-Jung Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 211 days.

(21) Appl. No.: 12/206,928

(22) Filed: Sep. 9, 2008

(65) Prior Publication Data

US 2009/0104303 A1 Apr. 23, 2009

(30) Foreign Application Priority Data

Oct. 22, 2007 (CN) .................. 2007 1 0202185.4

(51) Int. Cl.
*B29C 45/44* (2006.01)
(52) U.S. Cl. ............... 264/318; 264/328.1; 425/192 R; 425/330; 425/438; 425/441; 425/DIG. 58
(58) Field of Classification Search ............ 425/330, 425/438, 441, 556, 577, DIG. 5, DIG. 58, 425/190, 192 R; 264/328.1, 318
See application file for complete search history.

(56) References Cited

U.S. PATENT DOCUMENTS

| | | | | |
|---|---|---|---|---|
| 1,475,032 A | * | 11/1923 | Shrum et al. ................... | 72/397 |
| 2,330,762 A | * | 9/1943 | Tooker ........................ | 425/104 |
| 3,266,098 A | * | 8/1966 | Bucy .......................... | 249/141 |
| 3,811,645 A | * | 5/1974 | Feist ............................ | 249/68 |
| 4,889,480 A | * | 12/1989 | Nakamura et al. ............ | 425/577 |
| 5,135,700 A | * | 8/1992 | Williams et al. ............. | 264/318 |
| 5,407,344 A | * | 4/1995 | Rombalski et al. .......... | 425/190 |
| 5,490,966 A | * | 2/1996 | Peterson et al. ............. | 264/318 |
| 5,498,387 A | * | 3/1996 | Carter et al. ................. | 264/219 |
| 5,595,702 A | * | 1/1997 | Hiroki et al. ................ | 264/318 |
| 5,702,736 A | * | 12/1997 | Henein ........................ | 425/556 |
| 5,882,568 A | * | 3/1999 | Kashiwagi ................... | 264/275 |
| 6,659,760 B2 | * | 12/2003 | Liao et al. ................... | 425/577 |
| 7,104,774 B2 | * | 9/2006 | Buttigieg ..................... | 425/190 |
| 7,677,878 B2 | * | 3/2010 | Chen et al. ................... | 425/190 |
| 2003/0031752 A1 | * | 2/2003 | Liao et al. ................... | 425/577 |
| 2004/0109913 A1 | * | 6/2004 | Drees .......................... | 425/556 |
| 2005/0098295 A1 | * | 5/2005 | Dubay ......................... | 164/312 |
| 2006/0051450 A1 | * | 3/2006 | Kawai ......................... | 425/441 |

FOREIGN PATENT DOCUMENTS

CN 200941128 Y 8/2007

* cited by examiner

*Primary Examiner*—Yogendra N Gupta
*Assistant Examiner*—Emmanuel S Luk
(74) *Attorney, Agent, or Firm*—Clifford O. Chi

(57) ABSTRACT

A threaded core includes a first half core and a second half core. The first half core includes a core body and a movable core portion. The core body has a body surface and an end face adjacent to the body surface. An outside threaded portion is defined in the end face. The core body defines a recess on the body surface. The recess communicates with the groove. The movable core portion is movably mounted in the recess. The movable core portion has a front end face. An inside threaded portion is defined in the front end face and configured for forming part of the screw thread cooperatively with the first outside threaded portion. The second half core has an identical structure with the first half core. The inside and outside threaded portions of the first and second cores cooperatively define a screw hole.

17 Claims, 7 Drawing Sheets an injection molded apparatus including a first half mold and a second half mold is provided. The first half mold includes a first core fixture, a columned core mounted on the core fixture, and a threaded core mounted on the core fixture and coaxial with the threaded core. The second half mold includes a second core fixture and a core pin mounted in the core fixture and coaxial with the columned core —402 the positions of the first movable core portion and the second movable core portion of the threaded core are adjusted. The threaded core, the columned core, the core fixture and the second half mold cooperatively define a cavity with a shape of a lens barrel —404 injection molded materials are injected into the cavity, and the materials are cured to form a lens barrel —406 the injection molded apparatus is unloaded and the lens barrel is taken out from the injection molded apparatus —408

THREADED CORE, INJECTION MOLDED APPARATUS METHOD FOR MAKING LENS BARREL

BACKGROUND

1. Technical Field

The present invention relates to a threaded core, an injection molded apparatus for molding a lens barrel with the threaded core and a method for making a lens barrel using the injection molded apparatus.

2. Description of Related Art

The ongoing development in microcircuitry and multimedia technology has made digital cameras popular and in widespread use. High-end portable electronic devices, such as mobile phones and personal digital assistants, have become multi-functional. Many portable electronic devices are now equipped with a camera module. The camera module generally includes an optical module which includes a lens barrel.

An injection molded apparatus may be used to make the lens barrel. The injection molded apparatus includes a threaded core for molding the screw thread on the lens barrel.

Generally, the lens barrel is mounted in a holder via screw threads. It is desirable to maintain a torque force between the lens barrel and the holder in an appropriate range. If the torque force is too high, the rotation between the lens barrel and the holder will become difficult. If the torque force is too low, the lens barrel may deviate from the holder and result in eccentricity between the lens barrel and the holder.

A typical method to solve the torque problem is to process the threaded core of the injection molded apparatus by electro discharge machining (EDM), and then applying mold to make the lens barrel. However, the torque force between the lens barrel and the holder may still be unpredictable if the EDM process produced an insufficient mold. In addition, it cannot be repaired and must be replaced, reducing efficiency and increasing cost.

Therefore, a threaded core and injection molded apparatus capable of adjusting the torque force between the lens barrel and the holder is desired to overcome the above-described deficiencies.

SUMMARY

The threaded core includes a first half core and a second half core. The first half core includes a first core body and a first movable core portion. The first core body has a first body surface and a first end face adjacent to the first body surface. The first core body defines a first groove in the first end face. The first end face defines a first outside threaded portion communicating with the first groove. The first outside threaded portion is configured for forming a first portion of the screw thread. The first core body defines a first recess in the first body surface. The first recess communicates with the first groove. The first movable core portion is movably mounted in the first recess. The first movable core portion has a first front end face. A first inside threaded portion is defined in the first front end face and configured for forming a second portion of the screw thread and cooperating with the first outside threaded portion. The second half core includes a second core body and a second movable core portion. The second core body has a second body surface and a second end face adjacent to the second body surface. The second core body defines a second groove in the second end face. The second end face defines a second outside threaded portion communicating with the second groove. The second outside threaded portion is configured for forming a third portion of the screw thread. The second core body defines a second recess in the second body surface. The second recess communicates with the second groove. The second movable core portion is movably mounted in the second recess. The second movable core portion has a second front end face. A second inside threaded portion is defined in the second front end face and configured for forming a fourth portion of the screw thread and cooperating with the second outside threaded portion. The first end face of the first core body contacts the second end face of the second core body. The first outside threaded portion, the first inside threaded portion, the second outside threaded portion and the second inside threaded portion cooperatively define a screw hole for molding the screw thread of the lens barrel.

Other advantages and novel features of the present invention will become more apparent from the following detailed description of present embodiment when taken in conjunction with the accompanying drawings.

BRIEF DESCRIPTION OF THE DRAWINGS

Many aspects of the present threaded core and injection molded apparatus can be better understood with reference to the following drawings. The components in the drawing are not necessarily drawn to scale, the emphasis instead being placed upon clearly illustrating the principles of the present threaded core and injection molded apparatus. Moreover, in the drawings, like reference numerals designate corresponding parts throughout the several views.

FIG. 4 is a flow chart illustrating one embodiment of a method for making a lens barrel using an injection molded apparatus and the threaded core of FIG. 1.

DETAILED DESCRIPTION OF THE EMBODIMENTS

Embodiments of a threaded core and injection molded apparatus will now be described in detail below and with reference to the drawings.

Figure 1:
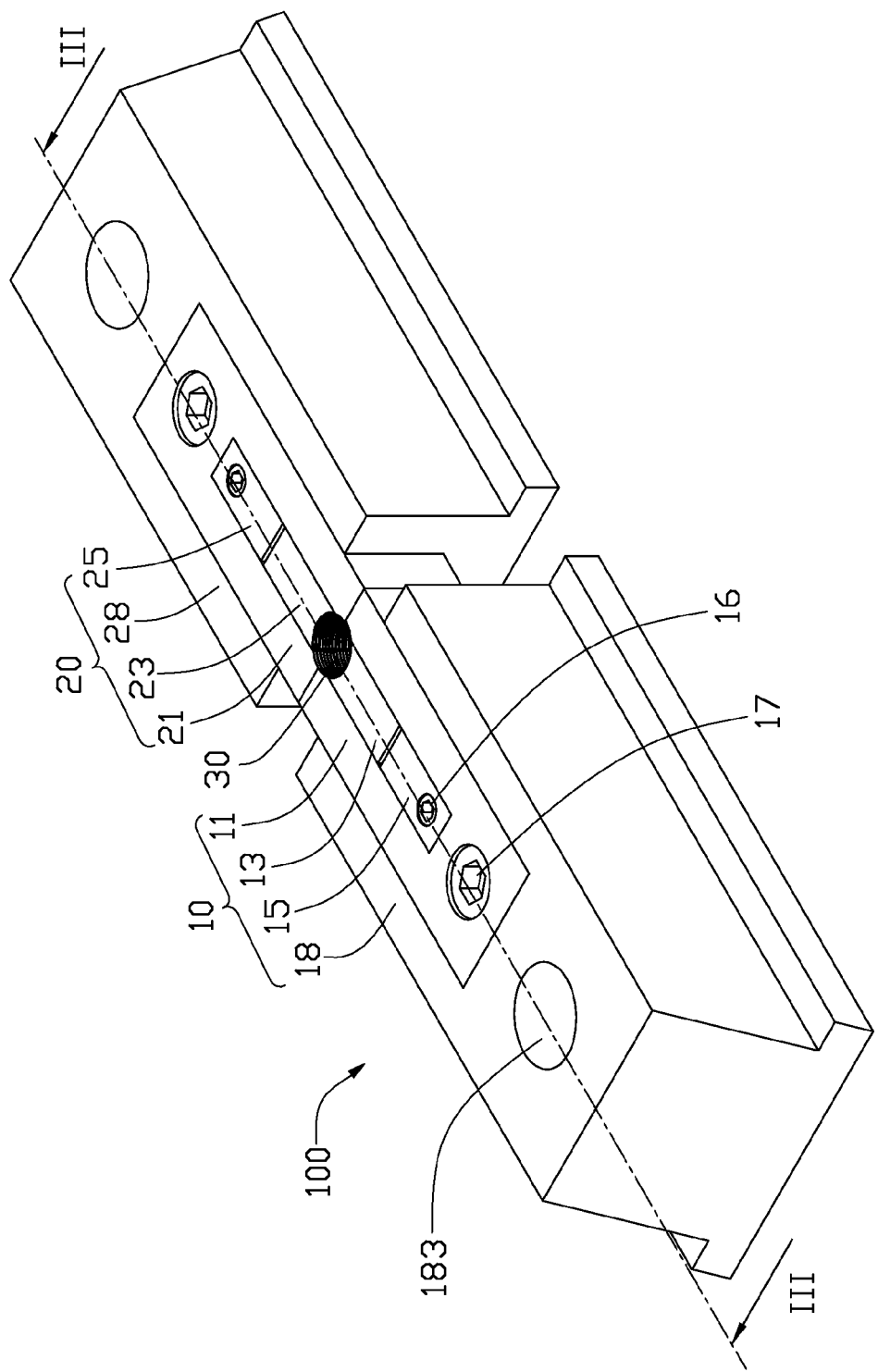
FIG. 1 is an assembled, isometric view of one embodiment of a threaded core.
Figure 7:
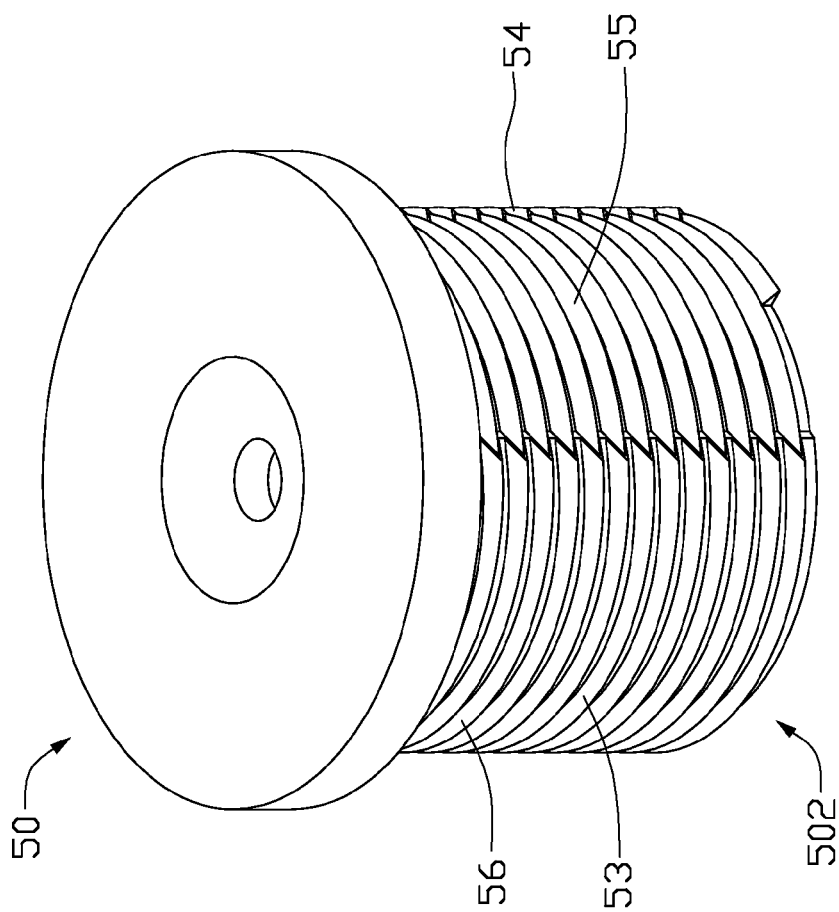
FIG. 7 is an isometric view of a lens barrel molded using the injection molded apparatus shown in FIG. 4.

Referring to FIG. 1, one embodiment of a threaded core 100 used in an injection molded apparatus includes a first half core 10 and a second half core 20. The threaded core 100 is configured for forming a screw thread 502 of a lens barrel 50 (see FIG. 7). The first half core 10 includes a first core body 11, a first movable core portion 13, a pressing plate 15 and a sliding member 18.

Figure 2:
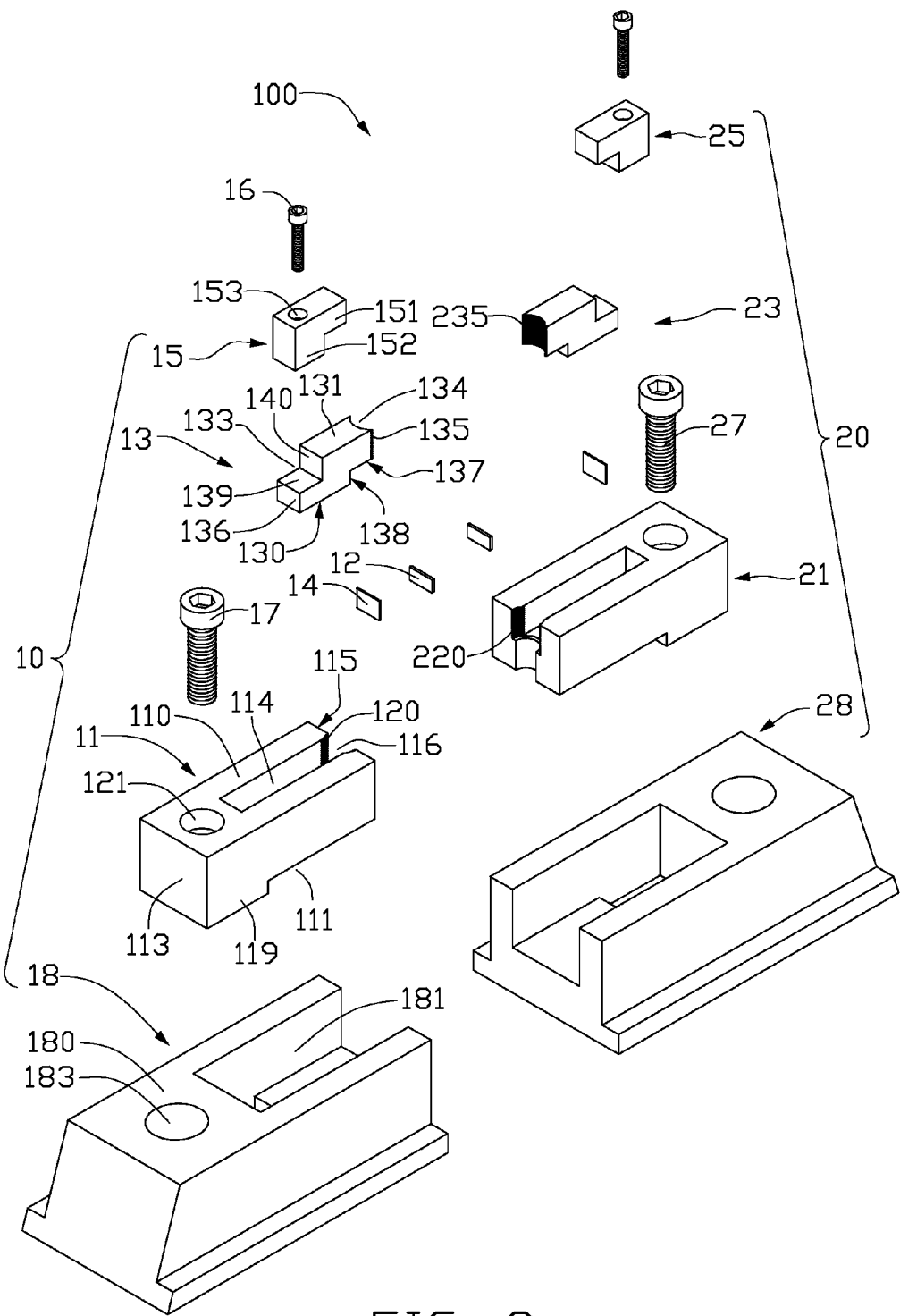
FIG. 2 is an exploded, isometric view of the threaded core of FIG. 1.

Referring also to FIG. 2, the first core body 11 has a first body surface 110 and an opposite second body surface 111. The first core body 11 has a first end face 115 and an opposite second end face 113. The first end face 115 is adjacent to and substantially perpendicular to the second body surface 111. A core body protrusion 119 protrudes from the second body surface 111 of the first core body 11 along the second end face 113 forming a protrusion surface (not labeled) parallel to the second body surface. The first core body 11 defines a groove 116 in the first end face 115.

Figure 3:
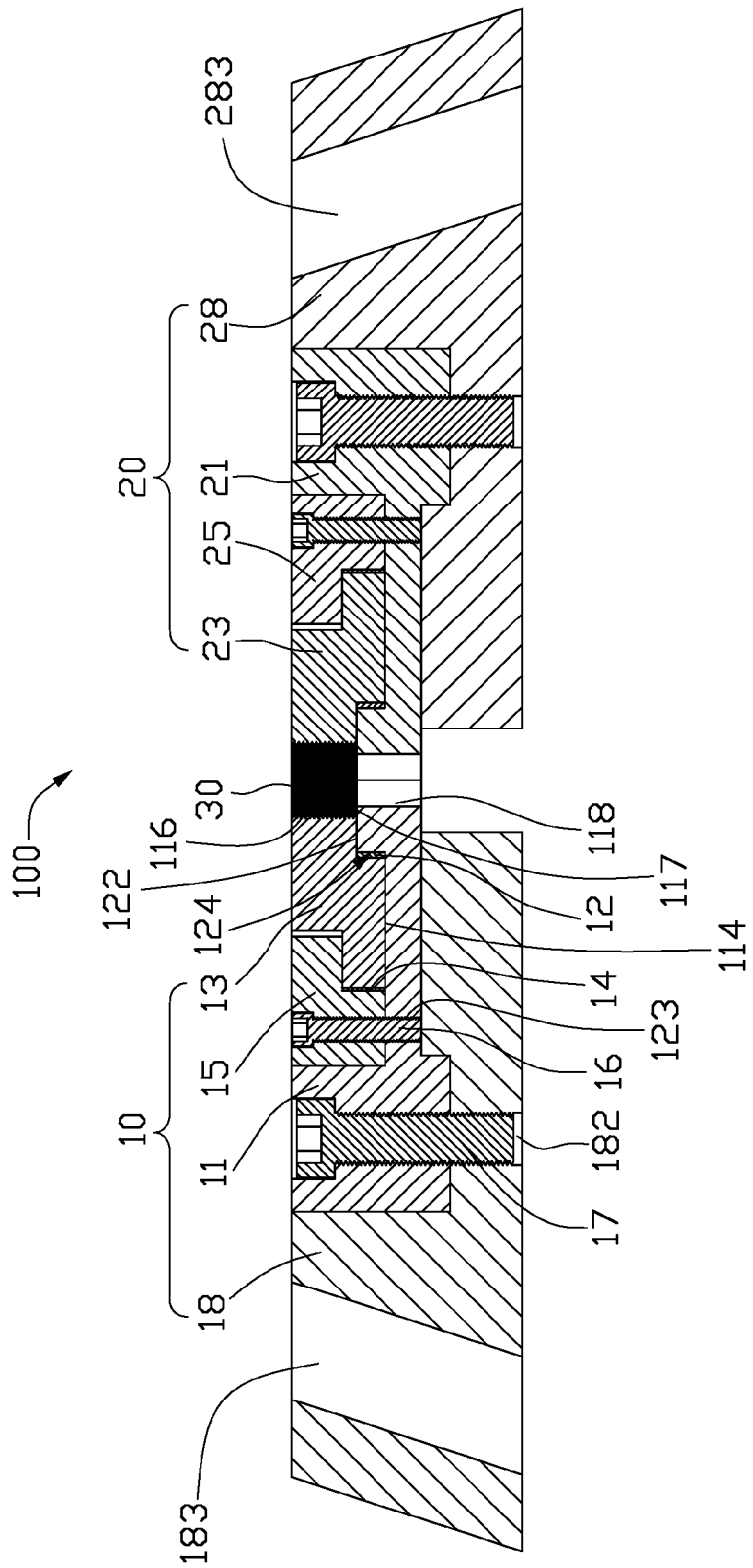
FIG. 3 is a cross-sectional view of the threaded core of FIG. 1, taken along line III-III.
Figure 5:
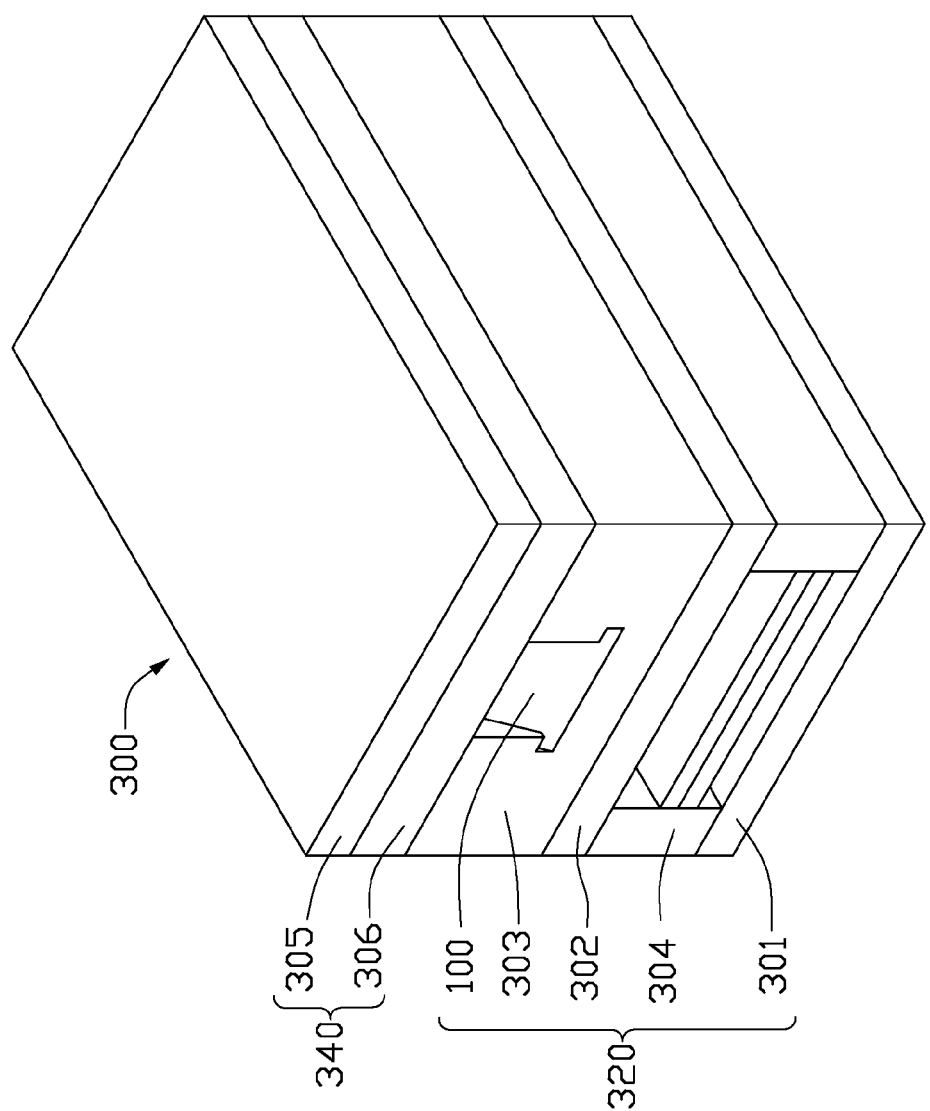
FIG. 5 is an assembled, isometric view of the injection molded apparatus and the threaded core of FIG. 1.

Referring also to FIG. 3, a groove bottom surface 122 of the groove 116 is substantially parallel to the second body surface 111. A depth of the groove bottom surface 122 is less than a distance between the first body surface 110 and the second body surface 111. The first end face 115 defines a first outside threaded portion 120 communicating with the groove 116. The first outside threaded portion 120 is configured for forming a first portion of the screw thread 502. The principal axis of the first outside threaded portion 120 is substantially perpendicular to the groove bottom surface 122. The first end face 115 defines a core opening 118. The core opening 118 and the first outside threaded portion 120 are substantially coaxial. The core opening 118 communicates with the groove 116.

The first core body 11 defines a first recess 114 in the groove bottom surface 122. The first recess 114 communicates with the groove 116. The first recess 114 has a depth larger than the depth of the groove bottom surface 122, thereby forming a recess sidewall 124. A threaded screw hole 123 is defined in a bottom surface (not labeled) of the first recess 114. The threaded screw hole 123 is a threaded hole configured to receive a threaded screw. In another embodiment, the threaded hole is a threaded insert. A first core body through hole 121 extending through the core body protrusion 119 is defined in the first body surface 110.

The first movable core portion 13 has a top surface 131 and an opposite bottom surface 130. A first protrusion (not labeled) extends along the top surface forming a front end face 134 adjacent to the top surface 131, a groove mating surface 137 adjacent to the front end face 134, and a first vertical surface 138 adjacent to the bottom surface 130 and the groove mating surface 137. A second protrusion (not labeled) extends along the bottom surface 130 forming a back end face 136 adjacent to the bottom surface 130, a pressing plate mating surface 139 adjacent to the back end face 136, and a second vertical surface 140 adjacent to the pressing plate mating surface 139 and the top surface 131. A first inside threaded portion 135 is defined in the front end face 134 and configured for forming a second portion of the screw thread 502. The principal axis of the first inside threaded portion 135 is substantially perpendicular to the groove mating surface 137.

The pressing plate 15 is L-shaped and defined by a horizontal portion 151 and a vertical portion 152 integrally connected to the horizontal portion 151. A pressing plate through hole 153 is defined in a top surface of the pressing plate 15 extending through the vertical portion. In the illustrated embodiment, the pressing plate through hole 153 is a countersunk through hole configured to receive a socket head cap screw.

The first movable core portion 13 and the first pressing plate 15 are removably fixed in the first recess 114. The groove mating surface 137 contacts the groove bottom surface 122 and the first vertical surface 138 faces towards the recess sidewall 124. A first spacer 12 is sandwiched between the first vertical surface 138 and the recess sidewall 124. The horizontal portion 151 contacts the pressing plate mating surface 139 and the vertical portion 152 faces towards a bottom surface of the first recess 114. A second spacer 14 is sandwiched between the vertical portion 152 and the back end face 136. The first and second spacers 12, 14 may be replaced by spacers having different thicknesses, so that the first inside threaded portion 135 can move towards or away from the principal axis of the first outside threaded portion 120. A space is defined between the horizontal portion 151 and the second vertical surface 140 of the first movable core portion 13, so that the first movable core portion 13 may move along the groove 116. Alternatively, the second spacer 14 can also be placed in the space sandwiched between the horizontal portion 151 and the second vertical surface 140 of the first movable core portion 13, and a space is defined between the vertical portion 152 and the back end face 136. The pressing plate through hole 153 is substantially coaxial with the threaded screw hole 123 of the bottom surface of the first recess 114. A fastener 16 is received in the pressing plate through hole 153 and the threaded screw hole 123 to fasten the pressing plate 15 to the first core body 11, thereby clamping the first movable core portion 13 against the first core body 11.

The first sliding member 18 defines a stepped recess 181 in a top surface 180 of the first sliding member 18. The first core body 11 is received in the stepped recess 181. The stepped recess 181 has a stepped structure so that the second body surface 111 and the protrusion surface (not labeled) of the third protrusion 119 can tightly contact a bottom surface of the first stepped recess 181. A threaded screw hole 182 is defined in a bottom surface of the first stepped recess 181, corresponding to the sliding member screw hole 121. The threaded screw hole 182 is a threaded hole configured to receive a threaded screw. In another embodiment, the threaded hole is a threaded insert. A fastener 17 is received in the sliding member screw hole 121 and the threaded screw hole 182, so that the first core body 11 is fastened to the first sliding member 18.

The second half core 20 includes a second core body 21, a second movable core portion 23, a second pressing member 25 and a second sliding member 28. The second pressing member 25 is identical to the first pressing member 15 and the second sliding member 28 is identical to the first sliding member. The second core body 21 is identical to the first core body 11 except that a second outside threaded portion 220 is configured for forming a third portion of the screw thread 502. The second movable portion 23 is identical to the first movable core portion 13 except that a second inside threaded portion 235 is configured for forming a fourth portion of the screw thread 502. In other words, the second outside and second inside threaded portion 220, 235 of the second half core 20 will be configured for cooperatively forming the screw thread 502 with the first half core 10.

In use, the first end face 115 of the first core body 11 tightly contacts the second core body 21. As shown in FIGS. 2 and 3, the first outside threaded portion 120, the first inside threaded portion 135, the second outside threaded portion 220 and the second inside threaded portion 235 cooperatively define a screw hole 30. The core opening 118 of the first half core 10 and a core opening of the second half core 20 cooperatively define a core receiving hole (not labeled).

Figure 6:
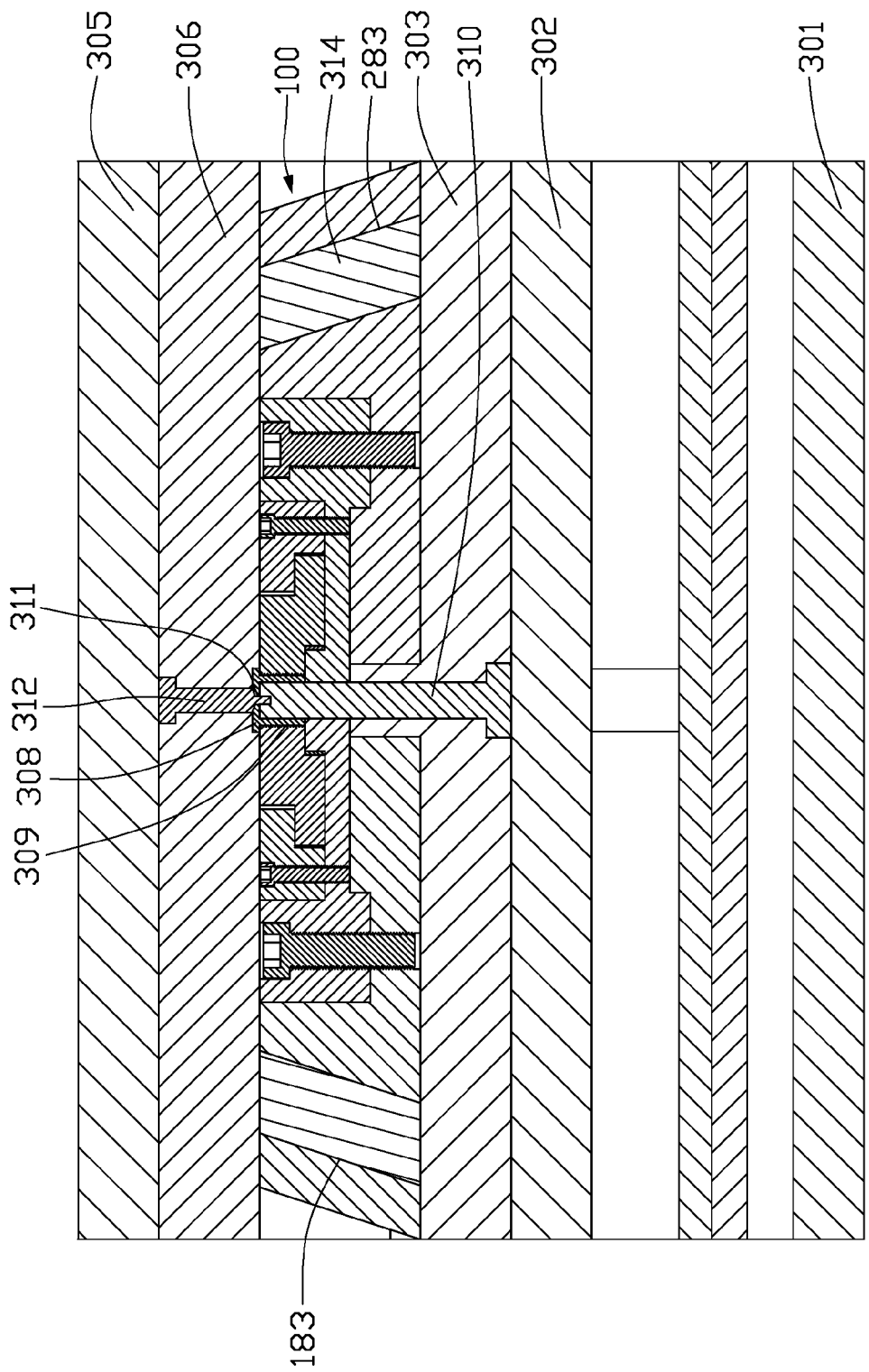
FIG. 6 is a cross-sectional view of the injection molded apparatus and the threaded core of FIG. 5, taken along line VI-VI.

The surface 180 of the first sliding member 18 and a surface of the second sliding member 28 respectively define column shaped inclination holes 183, 283 inclined with respect to the surfaces 180 and 280. The inclination holes 183, 283 are configured for receiving two inclination pins 314 (see FIG. 6) so that the first sliding member 18 and the second sliding member 28 can move closer to or apart from each other.

Referring to FIG. 4, a flowchart of one embodiment of a method for making a lens barrel is illustrated. Depending on the embodiment, certain of the steps described below may be removed, others may be added, and the sequence of steps may be altered.

Referring to FIGS. 4 through 7, in a step 402, an injection molded apparatus 300 is provided. The injection molded apparatus 300 includes a first half mold 320 and a second half mold 340 facing each other. The first half mold 320 includes a movable plate 301, a pad 304, a supporting board 302, and a first core fixture 303 sequentially stacked on one another. A columned core 310 is vertically fixed in the first core fixture 303 and one end of the of the columned core 310 extends out of the first core fixture 303. A pinhole 311 is defined in an end face of the columned core 310. The threaded core 100 as described in one embodiment is slidably mounted in the first core fixture 303. The first outside threaded portion 120, the first inside threaded portion 135, the second outside threaded portion 220 and the second inside threaded portion 235 cooperatively define a screw hole 30. The columned core 310 extends into the screw hole 30 and is coaxial with the screw hole 30.

The second half mold 340 includes a stationary plate 305, a second core fixture 306, and a core pin 312. The second core fixture 306 is mounted on the stationary plate 305. A columned recess 308 is defined in a surface of the second core fixture 306 and facing towards an end face of the columned core 310. The columned recess 308 is coaxial with the screw hole 30. The core pin 312 penetrates out of the second core fixture 306 at a center portion of the columned recess 308. The end portion of the core pin 312 is inserted into the pinhole 311. Two inclination pins 314 inclined with respect to a surface of the second core fixture 306 are mounted on the surface of the second core fixture 306. The incline angles of the inclination pins 314 are respectively adapted to the holes 183 and 283. The inclination pins 314 are respectively inserted into the holes 183 and 283 so that the first sliding member 18 and the second sliding member 28 can move closer to or apart from each other when the threaded core 100 is driven to move closer to or apart from the second core fixture 306.

Continuing to a step 404, the first movable core portion 13 and the second movable core portion 23 are adjusted to a predetermined position using the first spacer 12 and the second spacer 14. The threaded core 100, the columned core 310, the first core fixture 303, and the second half mold cooperatively define a cavity 309.

Moving to a step 406, molten materials are injected into the cavity 309 using an injection device (not shown). The materials in the cavity 309 are cured, thereby forming the lens barrel 50.

Continuing to a step 408, the injection molded apparatus 300 is unloaded, and the first half core 10 and the second half core 20 are driven to move apart from each other by the two guiding poles 314. The lens barrel 50 is then separated from the injection molded apparatus 300.

It is to be understood that the injection molded apparatus 300 may be designed to form more than one lens barrel at a time, and not limited to the embodiments described above.

When the lens barrel 50 is screwed into a holder (not shown), the torque force between the lens barrel 50 and the holder may be unpredictable. If the torque force is too high, the positions of the first movable core portion 13 and the second movable core portion 23 relative to the first and the second core body 11, 21 may need to be adjusted.

The first spacer 12 may be replaced by a thicker spacer or one or more spacers may be used between the first vertical surface 138 and the recess sidewall 124. Accordingly, the second spacer 14 would then be replaced by a thinner spacer. Thus, the first inside threaded portion 135 may move away from the principal axis of the screw hole 30. Similarly, the first inside threaded portion (not labeled) of the second movable core portion 23 may be moved away from the principal axis of the screw hole 30. The screw thread 502 includes two parts 53 and 54 corresponding to the first inside threaded portion 135 of the first movable core potion 13 and the first inside threaded portion 235 of the second movable core portion, respectively. The two parts 53 and 54 protrude with respect to other parts 55 and 56 of the screw thread 502. Thus, the torque force between the lens barrel 50 and the holder is increased. The two parts 53 and 54 are symmetrical with respect to the principal axis of lens barrel 50.

If the torque force is too large, the first movable core portion 13 and the second movable core portion 23 may move towards the principal axis of the screw hole 30 by replacing the first spacer 12 and the second spacer 14 for the first and second half core 10, 20.

A distance which the parts 53 and 54 protrude with respect to other parts 55 and 56 is preferably within a range of about 0.005 millimeters to about 0.03 millimeters.

One advantage of the injection molded apparatus 300 is that parts of the screw thread defined in the side surface of the lens barrel may be made to protrude with respect to other parts of the screw thread by replacing the first spacer 12, the second spacer 14 of the first half core 10 and these of the second half core 20. Thus, the torque force between the lens barrel and the holder can be adjusted without changing the threaded core.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A method for making a lens barrel, the method comprising:
   providing a injection molded apparatus, the molded apparatus comprising:
   a first half mold comprising:
      a first core fixture;
      a columned core; and
      a threaded core comprising:
         a first half core comprising:
            a first core body having a first body surface and a first end face adjacent to the first body surface, the first core body defining a first groove on the first end face, the first end face defining a first outside threaded portion communicating with the first groove, the first outside threaded portion being configured for forming a first portion of the screw thread, the first core body defining a first recess on the first body surface, the first recess communicating with the first groove; and
            a first movable core portion movably mounted in the first recess, the first movable core portion having a first front end face, a first inside threaded portion being defined in the first front end face and configured for forming a second portion of the screw thread and cooperating with the first outside threaded portion;
         a second half core comprising:
            a second core body having a second body surface and a second end face adjacent to the second body surface, the second core body defining a second groove in the second end face, the second end face defining a second outside threaded portion communicating with the second groove, the second outside threaded portion being configured for forming a third portion of the screw thread, the second core body defining a second recess on the second body surface, the second recess communicating with the second groove; and a second movable core portion movably mounted in the second recess, the second movable core portion having a second front end face, a second inside threaded portion being defined in the second front end face and configured for forming a fourth portion of the screw thread and cooperating with the second outside threaded portion;

wherein the first end face of the first core body is contacting the second end face of the second core body; the first outside threaded portion, the first inside threaded portion, the second outside threaded portion and the second inside threaded portion cooperatively define a screw hole for molding the screw thread of the lens barrel;

wherein the columned core is vertically fixed in the first core fixture; one end of the columned core extends to the screw hole defined by the first outside threaded portion, the first inside threaded portion, the second outside threaded portion and the second inside threaded portion; a pin hole is defined in the end face of the columned core; the threaded core is slidably mounted in the first core fixture; the columned core is coaxial with the screw hole defined by the first outside threaded portion, the first inside threaded portion, the second outside threaded portion and the second inside threaded portion;

a second half mold comprising a second core fixture and a core pin mounted in the second core fixture, wherein the second core fixture is positioned facing towards the first core fixture; the distal end of the core pin is inserted in the pinhole; adjusting positions of the first movable core portion and the second movable core portion of the threaded core by replacing the first and second spacers;

injecting injection molded materials into the cavity, and curing the materials to form a lens barrel;

unloading the injection molded apparatus and taking out the lens barrel from the injection molded apparatus.

2. A threaded core for molding a screw thread of a lens barrel, comprising:

a first half core comprising:

a first core body having a first body surface and a first end face adjacent to the first body surface, the first core body defining a first groove in the first end face, the first end face defining a first outside threaded portion communicating with the first groove, the first outside threaded portion being configured for forming a first portion of the screw thread, the first core body defining a first recess in the first body surface, the first recess communicating with the first groove; and a first movable core portion movably mounted in the first recess, the first movable core portion having a first front end face, a first inside threaded portion being defined in the first front end face and configured for forming a second portion of the screw thread and cooperating with the first outside threaded portion;

a second half core comprising:

a second core body having a second body surface and a second end face adjacent to the second body surface, the second core body defining a second groove in the second end face, the second end face defining a second outside threaded portion communicating with the second groove, the second outside threaded portion being configured for forming a third portion of the screw thread, the second core body defining a second recess in the second body surface, the second recess communicating with the second groove; and a second movable core portion movably mounted in the second recess, the second movable core portion having a second front end face, a second inside threaded portion being defined in the second front end face and configured for forming a fourth portion of the screw thread and cooperating with the second outside threaded portion; and wherein the first end face of the first core body is contacting the second end face of the second core body; the first outside threaded portion, the first inside threaded portion, the second outside threaded portion and the second inside threaded portion cooperatively define a screw hole for molding the screw thread of the lens barrel.

3. The threaded core of claim 2, wherein the first core body has a third body surface opposite to the first body surface; a first groove bottom surface of the first groove is substantially parallel to the third body surface; the first recess has a depth larger than a depth of the first groove, thereby forming a first recess sidewall;

the first movable core portion has a first top surface and a first bottom surface opposite the first top surface; a first protrusion extends along the first top surface forming the first front end face adjacent to the first top surface; a first groove mating surface is adjacent to the first front end face; a first vertical surface is adjacent to the first bottom surface and the first groove mating surface; a second protrusion extending along the first bottom surface forming a first back end face adjacent to the first bottom surface; a first pressing plate mating surface adjacent to the first back end face; a second vertical surface adjacent to the first pressing plate mating surface and the first top surface;

the first movable core portion is removably fixed in the first recess, the first groove mating surface contacts the first groove bottom surface and the first vertical surface facing towards the first recess sidewall; a first distance is defined between the first vertical surface and the first recess sidewall;

the second core body has a fourth body surface opposite to the second body surface; a second groove bottom surface of the second groove is substantially parallel to the fourth body surface; the second recess has a depth larger than a depth of the second groove, thereby forming a second recess sidewall;

the second movable core portion has a second top surface and a second bottom surface opposite the second top surface; a third protrusion extends along the second top surface forming the second front end face adjacent to the second top surface; a second groove mating surface is adjacent to the second front end face; a third vertical surface is adjacent to the second bottom surface and the second groove mating surface; a fourth protrusion extending along the second bottom surface forming a second back end face adjacent to the second bottom surface; a second pressing plate mating surface adjacent to the second back end face; a fourth vertical surface adjacent to the second pressing plate mating surface and the second top surface;

the second movable core portion is removably fixed in the second recess, the second groove mating surface contacts the second groove bottom surface and the second vertical surface facing towards the second recess sidewall; a second distance is defined between the second vertical surface and the second recess sidewall.

4. The threaded core of claim 3, wherein the first half core further comprises a first pressing plate comprising a first horizontal portion and a first vertical portion; the first vertical portion is integrally and vertically connected to an end of the first horizontal portion; a first screw hole is defined through the first vertical portion and extending through; the first horizontal portion contacts the first pressing plate mating surface; the first vertical portion faces towards a first bottom surface of the first recess, a third distance is defined between the first vertical portion and the first back end face of the first movable core portion; and a second pressing plate comprising a second horizontal portion and a second vertical portion; the second vertical portion is integrally and vertically connected to an end of the second horizontal portion; a second screw hole is defined through the second vertical portion and extending through; the second horizontal portion contacts the second pressing plate mating surface; the second vertical portion faces towards a second bottom surface of the second recess, a fourth distance is defined between the second vertical portion and the second back end face of the second movable core portion.

5. The threaded core of claim 4, wherein a third screw hole is defined through the first vertical portion and extends through; a fourth screw hole is defined in a first bottom surface of the first recess in the first core body; a first fastener is received in the third screw hole and the fourth screw hole to fasten the first pressing plate to the first core body, thereby clamping the first movable core portion against the first core body; and a fifth screw hole is defined through the second vertical portion and extends through; a sixth screw hole is defined in a second bottom surface of the second recess in the second core body; a second fastener is received in the fifth screw hole and the sixth screw hole to fasten the second pressing plate to the second core body, thereby clamping the second movable core portion against the second core body.

6. The threaded core of claim 5, further comprising a first spacer removably sandwiched between the first vertical surface and the first recess sidewall, and a second spacer sandwiched between the first vertical portion and the first back end face of the first movable core portion; and a third spacer removably sandwiched between the second vertical surface and the second recess sidewall, and a fourth spacer sandwiched between the second vertical portion and the second back end face of the second movable core portion.

7. The threaded core of claim 6, further comprising a first sliding member; a first stepped recess is defined in a surface of the first sliding member; the first core body is received in the first stepped recess; and a second sliding member; a second stepped recess is defined in a surface of the second sliding member; the second core body is received in the second stepped recess.

8. The threaded core of claim 7, wherein the first core body has a third end face opposite to the first end face; a fifth protrusion protrudes from the third body surface of the first core body and adjacent to the third end face; the first stepped recess has a stepped structure; the third body surface and a protrusion surface of the fifth protrusion is contacting a bottom surface of the first stepped recess; and a fourth end face opposite to the second end face; a sixth protrusion protrudes from the fourth body surface of the second core body and adjacent to the fourth end face; the second stepped recess has a stepped structure; the fourth body surface and a protrusion surface of the fifth protrusion is contacting a bottom surface of the first stepped recess.

9. The threaded core of claim 8, wherein a first sliding member screw hole is defined in the first core body between the third end face and the first recess; the first sliding member screw hole extends through the fifth protrusion; a first threaded screw hole is defined in a bottom surface of the first stepped recess, corresponding to the first sliding member screw hole; a third fastener is received in the first sliding member screw hole and the first threaded screw hole, so that the first core body is fastened on the first sliding member; and a second sliding member screw hole is defined in the second core body between the fourth end face and the second recess; the second sliding member screw hole extends through the sixth protrusion; a second threaded screw hole is defined in a bottom surface of the second stepped recess, corresponding to the second sliding member screw hole; a fourth fastener is received in the second sliding member screw hole and the second threaded screw hole, so that the core body is fastened on the second sliding member.

10. An injection molded apparatus for molding a lens barrel, comprising:

a first half mold comprising:

a first core fixture;

a columned core; and a threaded core comprising:

a first half core comprising:

a first core body having a first body surface and a first end face adjacent to the first body surface, the first core body defining a first groove on the first end face, the first end face defining a first outside threaded portion communicating with the first groove, the first outside threaded portion being configured for forming a first portion of the screw thread, the first core body defining a first recess on the first body surface, the first recess communicating with the first groove; and a first movable core portion movably mounted in the first recess, the first movable core portion having a first front end face, a first inside threaded portion being defined in the first front end face and configured for forming a second portion of the screw thread and cooperating with the first outside threaded portion;

a second half core comprising:

a second core body having a second body surface and a second end face adjacent to the second body surface, the second core body defining a second groove in the second end face, the second end face defining a second outside threaded portion communicating with the second groove, the second outside threaded portion being configured for forming a third portion of the screw thread, the second core body defining a second recess on the second body surface, the second recess communicating with the second groove; and a second movable core portion movably mounted in the second recess, the second movable core portion having a second front end face, a second inside threaded portion being defined in the second front end face and configured for forming a fourth portion of the screw thread and cooperating with the second outside threaded portion;

wherein the first end face of the first core body is contacting the second end face of the second core body; the first outside threaded portion, the first inside threaded portion, the second outside threaded portion and the second inside threaded portion cooperatively define a screw hole for molding the screw thread of the lens barrel; wherein the columned core is vertically fixed in the first core fixture; one end of the columned core extends to the screw hole defined by the first outside threaded portion, the first inside threaded portion, the second outside threaded portion and the second inside threaded portion; a pin hole is defined in the end face of the columned core; the threaded core is slidably mounted in the first core fixture; the columned core is coaxial with the screw hole defined by the first outside threaded portion, the first inside threaded portion, the second outside threaded portion and the second inside threaded portion;

a second half mold comprising a second core fixture and a core pin mounted in the second core fixture, wherein the second core fixture is positioned facing towards the first core fixture; the distal end of the core pin is inserted in the pinhole.

11. The injection molded apparatus of claim 10, wherein the first core body has a third body surface opposite to the first body surface; a first groove bottom surface of the first groove is substantially parallel to the third body surface; the first recess has a depth larger than a depth of the first groove, thereby forming a first recess sidewall;

the first movable core portion has a first top surface and a first bottom surface opposite the first top surface; a first protrusion extends along the first top surface forming the first front end face adjacent to the first top surface; a first groove mating surface is adjacent to the first front end face; a first vertical surface is adjacent to the first bottom surface and the first groove mating surface; a second protrusion extending along the first bottom surface forming a first back end face adjacent to the first bottom surface; a first pressing plate mating surface adjacent to the first back end face; a second vertical surface adjacent to the first pressing plate mating surface and the first top surface;

the first movable core portion is removably fixed in the first recess, the first groove mating surface contacts the first groove bottom surface and the first vertical surface facing towards the first recess sidewall; a first distance is defined between the first vertical surface and the first recess sidewall;

the second core body has a fourth body surface opposite to the second body surface; a second groove bottom surface of the second groove is substantially parallel to the fourth body surface; the second recess has a depth larger than a depth of the second groove, thereby forming a second recess sidewall;

the second movable core portion has a second top surface and a second bottom surface opposite the second top surface; a third protrusion extends along the second top surface forming the second front end face adjacent to the second top surface; a second groove mating surface is adjacent to the second front end face; a third vertical surface is adjacent to the second bottom surface and the second groove mating surface; a fourth protrusion extending along the second bottom surface forming a second back end face adjacent to the second bottom surface; a second pressing plate mating surface adjacent to the second back end face; a fourth vertical surface adjacent to the second pressing plate mating surface and the second top surface;

the second movable core portion is removably fixed in the second recess, the second groove mating surface contacts the second groove bottom surface and the second vertical surface facing towards the second recess sidewall; a second distance is defined between the second vertical surface and the second recess sidewall.

12. The injection molded apparatus of claim 11, wherein the first half core further comprises a first pressing plate comprising a first horizontal portion and a first vertical portion; the first vertical portion is integrally and vertically connected to an end of the first horizontal portion; a first screw hole is defined through the first vertical portion and extending through; the first horizontal portion contacts the first pressing plate mating surface; the first vertical portion faces towards a first bottom surface of the first recess, a third distance is defined between the first vertical portion and the first back end face of the first movable core portion; and a second pressing plate comprising a second horizontal portion and a second vertical portion; the second vertical portion is integrally and vertically connected to an end of the second horizontal portion; a second screw hole is defined through the second vertical portion and extending through; the second horizontal portion contacts the second pressing plate mating surface; the second vertical portion faces towards a second bottom surface of the second recess, a fourth distance is defined between the second vertical portion and the second back end face of the second movable core portion.

13. The injection molded apparatus of claim 12, wherein a third screw hole is defined through the first vertical portion and extends through; a fourth screw hole is defined in a first bottom surface of the first recess in the first core body; a first fastener is received in the third screw hole and the fourth screw hole to fasten the first pressing plate to the first core body, thereby clamping the first movable core portion against the first core body; and a fifth screw hole is defined through the second vertical portion and extends through; a sixth screw hole is defined in a second bottom surface of the second recess in the second core body; a second fastener is received in the fifth screw hole and the sixth screw hole to fasten the second pressing plate to the second core body, thereby clamping the second movable core portion against the second core body.

14. The injection molded apparatus of claim 13, wherein the threaded core further comprises a first spacer removably sandwiched between the first vertical surface and the first recess sidewall, and a second spacer sandwiched between the first vertical portion and the first back end face of the first movable core portion; and a third spacer removably sandwiched between the second vertical surface and the second recess sidewall, and a fourth spacer sandwiched between the second vertical portion and the second back end face of the second movable core portion.

15. The injection molded apparatus of claim 14, wherein the threaded core further comprises a first sliding member; a first stepped recess is defined in a surface of the first sliding member; the first core body is received in the first stepped recess; and a second sliding member; a second stepped recess is defined in a surface of the second sliding member; the second core body is received in the second stepped recess.

16. The injection molded apparatus of claim 15, wherein the first core body has a third end face opposite to the first end face; a fifth protrusion protrudes from the third body surface of the first core body and adjacent to the third end face; the first stepped recess has a stepped structure; the third body surface and a protrusion surface of the fifth protrusion is contacting a bottom surface of the first stepped recess; and a fourth end face opposite to the second end face; a sixth protrusion protrudes from the fourth body surface of the second core body and adjacent to the fourth end face; the second stepped recess has a stepped structure; the fourth body surface and a protrusion surface of the fifth protrusion is contacting a bottom surface of the first stepped recess.

17. The injection molded apparatus of claim 16, wherein a first sliding member screw hole is defined in the first core body between the third end face and the first recess; the first sliding member screw hole extends through the fifth protrusion; a first threaded screw hole is defined in a bottom surface of the first stepped recess, corresponding to the first sliding member screw hole;

a third fastener is received in the first sliding member screw hole and the first threaded screw hole, so that the first core body is fastened on the first sliding member; and a second sliding member screw hole is defined in the second core body between the fourth end face and the second recess; the second sliding member screw hole extends through the sixth protrusion; a second threaded screw hole is defined in a bottom surface of the second stepped recess, corresponding to the second sliding member screw hole; a fourth fastener is received in the second sliding member screw hole and the second threaded screw hole, so that the core body is fastened on the second sliding member.

\* \* \* \* \*